Oct. 4, 1932.    A. R. FURNAS    1,880,430
TIRE MOLD
Filed Feb. 14, 1931    2 Sheets-Sheet 1
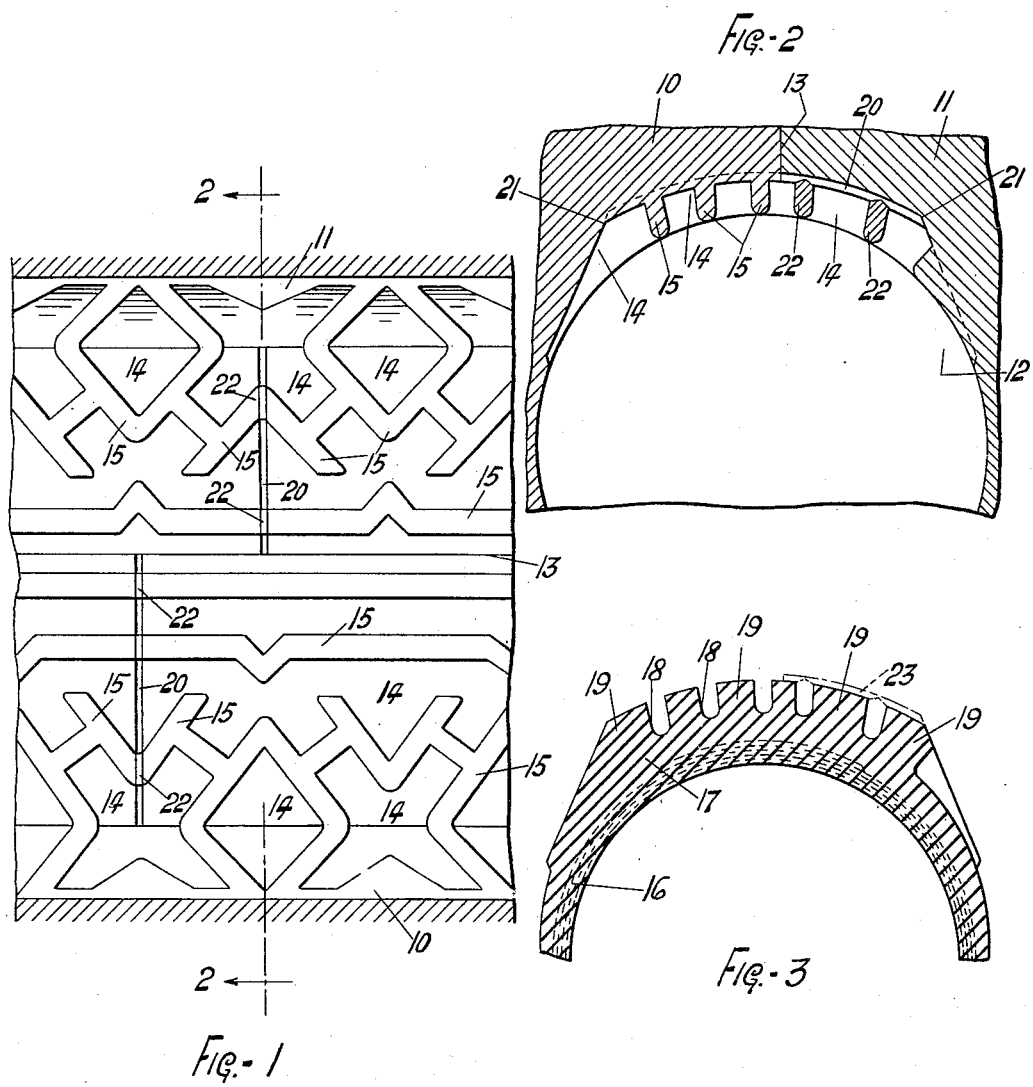
INVENTOR
AUBREY R. FURNAS
BY
ATTORNEYS Oct. 4, 1932. A. R. FURNAS 1,880,430
TIRE MOLD
Filed Feb. 14, 1931 2 Sheets-Sheet 2
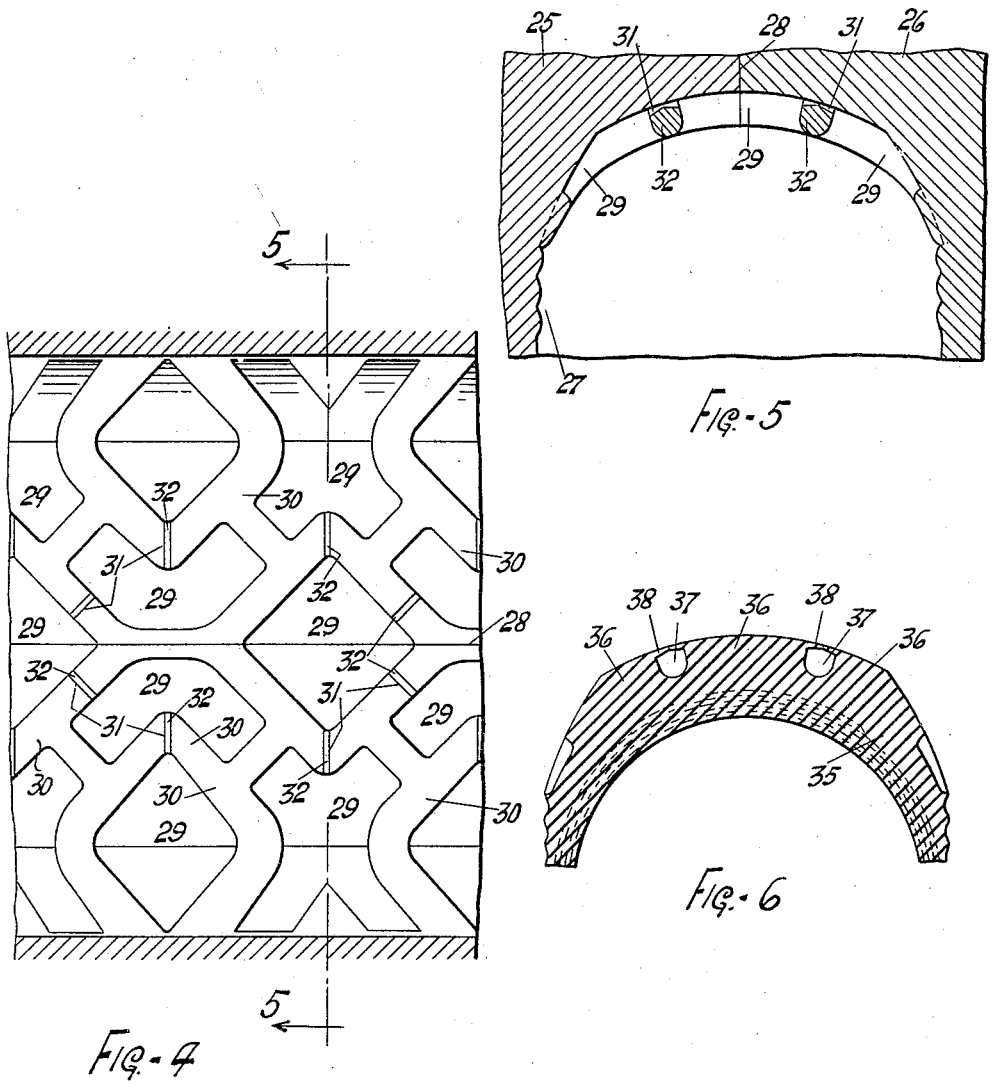

Patented Oct. 4, 1932

1,880,430

UNITED STATES PATENT OFFICE

AUBREY R. FURNAS, OF UNIONTOWN, OHIO, ASSIGNOR TO THE FIRESTONE TIRE & RUBBER COMPANY, OF AKRON, OHIO, A CORPORATION OF OHIO

TIRE MOLD

Application filed February 14, 1931. Serial No. 515,780.

This invention relates to tire molds and methods of making tires and more especially it relates to apparatus and procedure for making pneumatic tire casings.

Tires of the character mentioned usually are formed with distinctive and characteristic tread configurations which serve to identify the tire, and to prevent skidding on slippery pavements. The tread design usually comprises suitably shaped lugs or ribs separated by grooves, and in some designs the lugs are isolated, that is, completely separated from adjacent lugs. In such cases it is customary to interconnect the lug-forming recesses in the cavity of the tire mold by means of narrow kerfs or slots to permit air, entrapped in said recesses during the molding of a tire, to flow to the margin of the mold cavity and to escape from the mold at the meeting plane between the upper and lower sections thereof.

Tires vulcanized in molds of this kind have narrow webs of rubber connecting the respective lugs of their tread structure, which webs are formed by the venting kerfs. Because of the narrow width of the kerfs, there is considerable frictional resistance to the flow of the rubber thereinto, with the result that frequently the kerfs are not completely filled with rubber and the resulting lug-connecting webs of the tire are incomplete, usually being notched in their outer, unattached margins. In use, the flexing of the tire splits the webs, the splits starting at the apex of the notches in the webs and extending to the bottom of the webs and into the body structure of the tire tread, resulting in premature failure of the tire.

The chief objects of this invention are to prevent premature failure of pneumatic tires from tread cracking; to produce pneumatic tire casings having tread designs comprising isolated characters or lugs without webs interconnecting said lugs; to provide a suitable mold for use in producing tires of such construction; and to provide a novel, economical, and efficient method of making such tires.

Of the accompanying drawings:

Figure 1 is a fragmentary elevation of the outer periphery of a molding cavity in a tire mold embodying and adapted to carry out the invention in its preferred form;

Figure 2 is a section on a smaller scale on line 2—2 of Figure 1;

Figure 3 is a fragmentary transverse section of a finished tire made according to the improved method;

Figure 4 is a view similar to Figure 1 of a modified form of the improved mold;

Figure 5 is a section, on a smaller scale, on the line 5—5 of Figure 4; and

Figure 6 is a fragmentary transverse section of a tire made in the modified mold.

Referring to Figures 1 and 2 of the drawings, the improved tire mold consists of a pair of annular mating mold sections 10, 11 which are interiorly formed with a molding cavity 12 for a pneumatic tire casing, and in the embodiment shown the mold sections meet at a plane 13 which is disposed at one side of the medial plane of the molding cavity 12. The outer peripheral wall of the cavity 12 is formed with isolated recesses 14, 14 which are defined by intervening ribs 15, 15, said recesses being adapted to form the lugs or characters of the tread portion of a tire, the ribs 15 forming the grooves therebetween. Such a tire is shown in Figure 3 wherein 16 is a tire carcass, 17 the tread portion thereof, 18, 18 the grooves formed in said tread, and 19, 19 the lugs defined by said grooves.

Formed in each mold section, at suitable intervals circumferentially of the cavity 12 therein, are kerfs or slots 20, 20 which preferably are concentric with the transverse radius of the cavity at the outer periphery thereof, said kerfs extending from the respective shoulders 21, 21 of the tread-forming portion of the cavity to the parting plane 13 of the mold. The kerfs 20 cut through the intervening ribs 15 and are of greater depth than the recesses 14 so as to penetrate the mold structure below the bottom of the recesses, as is clearly shown in Figure 2.

In the slots formed by the kerfs 20 in the ribs 15 are mounted fillers 22, 22 which consist of metal plates of the same general contour as the ribs. That margin of each filler 22 that extends below the bottom of the recesses 14 is tapered or oppositely inclined from its middle, as is shown in Figure 2, the apex of the taper being slightly spaced (about 1/32 inch) away from the bottom of the kerf. The arrangement is such that air entrapped in the recesses 14 of the molding cavity during the mounting of a tire therein can escape from the recesses by means of the kerfs 20 in the usual manner since the continuity of the kerfs is not entirely obstructed by the fillers 22.

Tires are vulcanized in the improved molds in the usual manner, and during the vulcanizing of the tires the tread rubber thereof flows into the kerfs 20 and around the tapered ends of the fillers 22, forming low transverse ribs 23 on the tread of the tire as indicated in broken lines in Figure 3. In removing the tires from the molds, the thin portions of the ribs 23 which overlie the tapered edges of the fillers 22 are readily broken so that no difficulty is encountered in removing the tire.

The ribs 23 subsequently are removed from the tire by buffing. In the finished tire there are no webs spanning the grooves 18 therein, and the bottoms of the latter are rounded as shown so that there is no tendency for tread-cracks to start in the grooves.

In the modification shown in Figures 4, 5 and 6, mold sections 25, 26 are formed interiorly with a tire molding cavity 27, the medial plane of the cavity being coincident with the parting plane 28 of the mold sections. The tread-forming region of the cavity 27 is formed with isolated recesses 29, 29 which are defined by intervening ribs 30, 30 similar to recesses and ribs of the preferred structure.

The recesses 29 remote from the parting plane 28 are connected to the recesses contiguous therewith by kerfs 31, 31 which transect the ribs 30, the bottoms of the kerfs being flush with the bottoms of the recesses. Mounted in the kerfs 31 are fillers 32, 32 which conform generally to the contour of the ribs 30. The fillers extend almost to the bottoms of the kerfs, and have their bottom margins tapered or oppositely inclined from the middle, the apex of the taper being slightly spaced from the mold wall, as is clearly shown in Figure 5 to provide apertures through the ribs 30 from one recess 29 to another. The arrangement effects the venting of entrapped air from the molding cavity 27 during the molding of a tire.

A tire vulcanized in the modified mold structure is shown at 35, Figure 6, the tread portion of the tire comprising lugs 36, 36 defined by intervening grooves 37, 37. Spanning the grooves 37 are small strands or ribs of rubber 38 which are integral with the lugs 36, said strands being formed by the flow of rubber into the vent apertures beneath the fillers 32, the strands being centrally ruptured as shown during the removal of the tire from the mold. The strands 38 serve no function and have no effect on the tire during service, the tire having the same desirable characteristics as the preferred structure shown in Figure 3.

Modifications may be resorted to without departing from the spirit of the invention or the scope of the appended claims.

What is claimed is:

1. A tire mold comprising mating mold sections interiorly formed with a molding cavity including recesses defined by intervening ribs at the tread-molding region thereof, said recesses being interconnected by venting apertures at the base of the ribs.

2. A tire mold comprising mating mold sections interiorly formed with a molding cavity including recesses defined by intervening ribs at the tread-molding region thereof, said recesses being interconnected for venting purposes by kerfs in the bottoms of the recesses, which kerfs extend beneath the said ribs.

3. A tire mold as defined in claim 2 in which the kerfs are of restricted area beneath the ribs.

4. A tire mold comprising mating mold sections formed interiorly with a molding cavity including recesses defined by intervening ribs at the tread-molding region thereof, said recesses being interconnected for venting purposes by kerfs which transect said ribs, and fillers in the kerfs in said ribs, said fillers being so constructed and arranged as to define apertures through the ribs at the base thereof.

5. A tire mold as defined in claim 4 in which the fillers are so shaped that the venting apertures defined thereby are locally constricted.

6. A tire mold as defined in claim 4 in which the bottom margins of the kerfs are tapered so that the apertures defined by the kerfs are centrally constricted.

7. A tire mold comprising mating mold sections formed interiorly with a molding cavity, including isolated recesses defined by intervening ribs at the tread-molding region thereof, said recesses being interconnected for venting purposes by kerfs which transect said ribs and extend below the bottoms of the recesses, and fillers mounted in the kerfs in said ribs defining through passages below the bottoms of the ribs.

8. A tire mold as defined in claim 7 in which each filler has a projecting portion extending into the passage below the rib and locally constricting said passage.

9. A tire mold as defined in claim 7 in which each filler has a margin that is tapered to a point, said tapered portion extending into the passage below the rib and locally constricting the same.

AUBREY R. FURNAS.